US012717525B2

(12) United States Patent
Das et al.

(10) Patent No.: US 12,717,525 B2
(45) Date of Patent: Aug. 25, 2026

(54) SWAPPING A PHYSICAL BLOCK OF A VIRTUAL BLOCK BASED ON A BIT ERROR RATE OF THE PHYSICAL BLOCK

(71) Applicant: Microchip Technology Incorporated, Chandler, AZ (US)

(72) Inventors: Saswati Das, Milpitas, CA (US); Nian Niles Yang, Mountain View, CA (US); Srinivas Yelisetti, Fremont, CA (US)

(73) Assignee: Microchip Technology Incorporated

( * ) Notice: Subject to any disclaimer, the term of this patent is extended or adjusted under 35 U.S.C. 154(b) by 26 days.

(21) Appl. No.: 19/031,473

(22) Filed: Jan. 18, 2025

(65) Prior Publication Data

US 2025/0390251 A1 Dec. 25, 2025

Related U.S. Application Data

(60) Provisional application No. 63/664,178, filed on Jun. 25, 2024.

(51) Int. Cl.
*G06F 3/06* (2006.01)

(52) U.S. Cl.
CPC .......... *G06F 3/0665* (2013.01); *G06F 3/0604* (2013.01); *G06F 3/064* (2013.01); *G06F 3/0679* (2013.01)

(58) Field of Classification Search
CPC .... G06F 3/0665; G06F 3/0604; G06F 3/0679; G06F 3/064
See application file for complete search history.

(56) References Cited

U.S. PATENT DOCUMENTS

| | | | | |
|---|---|---|---|---|
| 10,877,900 | B1 * | 12/2020 | Muthiah | G06F 12/1009 |
| 12,423,004 | B1 * | 9/2025 | Steiner | G06F 3/0619 |
| 2012/0226963 | A1 * | 9/2012 | Bivens | G11C 29/42<br>714/E11.054 |
| 2014/0208062 | A1 * | 7/2014 | Cohen | G06F 3/0688<br>711/206 |
| 2014/0269072 | A1 * | 9/2014 | Suzuki | G06F 12/0246<br>365/185.11 |
| 2015/0067415 | A1 * | 3/2015 | Miyamoto | G06F 11/073<br>714/704 |

(Continued)

OTHER PUBLICATIONS

International Search and Written Opinion, PCT Application No. PCT/US2025/039359, mailed Nov. 21, 2025, 11 pages.

*Primary Examiner* — Eric T Loonan
(74) *Attorney, Agent, or Firm* — Hovey Williams LLP

(57) ABSTRACT

In some implementations, a controller may select a physical block, of a user data virtual block (VB), for a host write operation or a garbage collection operation. The user physical block previously stored user data. The user physical block has previously been programmed in accordance with triple-level cell (TLC) programming. The controller may determine that an average bit error rate (BER) of the user physical block exceeds an average BER of the VB. The controller may, based on determining that the average BER of the physical block exceeds the average BER of the user VB: swap, for the VB, the user physical block with a system physical block that is allocated for storing system data; swap, for the VB, the user physical block with a reserved physical block; or cause a program time, of the user physical block, to be increased.

21 Claims, 6 Drawing Sheets

(56) References Cited

U.S. PATENT DOCUMENTS

2015/0347228 A1* 12/2015 Yang .................. G06F 11/1048
714/704
2017/0097869 A1* 4/2017 Sharon ................ G06F 11/1072
2019/0347013 A1* 11/2019 Pletka .................... G06F 3/064
2020/0051628 A1* 2/2020 Joo .................... G11C 13/0069
2020/0110536 A1* 4/2020 Navon .................. G06F 3/0616
2020/0183771 A1 6/2020 Liikanen
2022/0137842 A1 5/2022 Hung et al.
2022/0382452 A1* 12/2022 Inbar ..................... G06F 3/0619
2023/0197186 A1 6/2023 Shetty et al.
2025/0077102 A1* 3/2025 Dutta .................... G06F 3/0608

* cited by examiner

301

| VB ID | PEC/BER | Type | Available? |
|---|---|---|---|
| VB0 | Low | System (SLC) | No |
| VB1 | Low | System (SLC) | Yes |
| VB2 | Low | OP | Yes |
| VB3 | Low | OP | No |
| VB4 | Moderate | User | Yes |
| *VB5* | *Very High* | *User* | *No* |
| VB6 | Very High | User | Yes |
| VB7 | Low | User | No |

FIG. 3

SWAPPING A PHYSICAL BLOCK OF A VIRTUAL BLOCK BASED ON A BIT ERROR RATE OF THE PHYSICAL BLOCK

RELATED APPLICATION

This application claims priority to U.S. Provisional Patent Application No. 63/664,178, entitled "SWAPPING A PHYSICAL BLOCK OF A VIRTUAL BLOCK BASED ON A BIT ERROR RATE OF THE PHYSICAL BLOCK," filed Jun. 25, 2024, which is incorporated herein by reference in its entirety.

FIELD

The present disclosure generally relates to reducing an uncorrectable bit error rate (UBER) of a solid state drive (SSD) and, for example, to reducing the UBER based on a quantity of program/erase (P/E) cycles of a non-volatile memory device of the SSD.

BACKGROUND

A non-volatile memory device may include a storage device that may store and retain data without external power supply. One example of a storage device is a NAND flash memory device. A solid state drive (SSD) may include multiple non-volatile memory devices. A non-volatile memory device (or a die of the non-volatile memory device) may include multiple planes. A plane may include multiple blocks and a block may include multiple wordline. A wordline may include one or more pages.

In some situations, the physical blocks across multiple non-volatile memory devices (or dies of the multiple non-volatile memory devices) may form a virtual block (VB). The VB is a collection of blocks (e.g., memory blocks) across all logical unit numbers (LUNs). A VB has a size that varies according to number of bad blocks. For example, if no bad blocks, the size=(#Channels)×(#Targets)×(#LUNs)×(Physical Block Size). The VB includes multiple virtual pages. A virtual page is a collection of pages across all LUNs in a VB.

Typically, a reliability of the SSD decreases as the age of the non-volatile memory device increases. The decrease in reliability leads to an increase in read errors.

SUMMARY

A method comprising: selecting a user virtual block (VB), for a host write operation or a garbage collection operation, wherein the user VB previously stored user data, and wherein the user VB has previously been programmed in accordance with triple-level cell (TLC) programming; determining that an average bit error rate (BER) of a user physical block in the user VB exceeds an average BER of the user VB; and based on determining that the average BER of the user physical block exceeds the average BER of the user VB: swapping, for the user VB, the user physical block with a system physical block that is allocated for storing system data; swapping, for the user VB, the user physical block with a reserved physical block; or causing a program time, of the user physical block, to be increased.

A system comprising: a controller to: select a first physical block, of a virtual block (VB), for a host write operation or a garbage collection operation, wherein the first physical block previously stored user data; determine that an average bit error rate (BER) of the first physical block exceeds an average BER of the VB; and based on determining that the average BER of the first physical block exceeds the average BER of the VB: swap, for the VB, the first physical block with a second physical block; or cause a program time, of the first physical block, to be increased.

A non-transitory computer-readable medium storing a set of instructions, the set of instructions comprising: one or more instructions that, when executed by one or more processors of a controller, cause the controller to: determine that an average bit error rate (BER) of a user physical block, of a virtual block (VB), exceeds an average BER of the VB; and based on determining that the average BER of the physical block exceeds the average BER of the VB: swap, for the VB, the user physical block with a system physical block that is allocated for storing system data; swap, for the VB, the user physical block with a reserved physical block; or cause a program time, of the user physical block, to be increased.

BRIEF DESCRIPTION OF THE DRAWINGS

FIG. 3 illustrates an example of monitoring per-VB metrics, as described herein.

DETAILED DESCRIPTION

Figure 1:
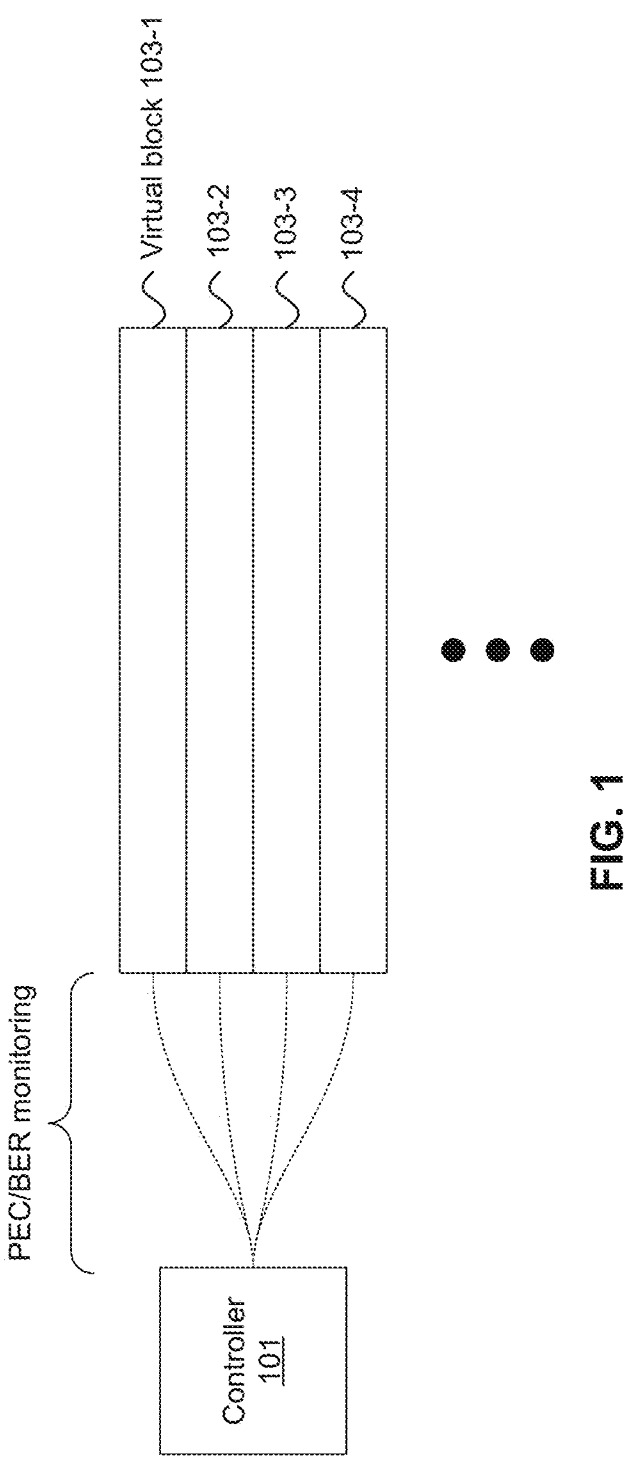
FIGS. 1 and 2 are diagrams of an example of monitoring metrics associated with one or more virtual and/or physical blocks of a memory device, as described herein.

The following detailed description of example implementations refers to the accompanying drawings. The same reference numbers in different drawings may identify the same or similar elements.

A solid state drive (SSD) may provide data regarding the SSD to a host device associated with the SSD. The SSD may include multiple non-volatile memory devices. The multiple non-volatile memory devices (or dies of the multiple non-volatile memory devices) may form a virtual block (VB). The VB is a collection of blocks (e.g., memory blocks) across all logical unit numbers (LUNs). As used herein, a "block" may be used to refer to a physical block, unless the term "block" is used in conjunction with the term "virtual" (e.g., "virtual block").

Blocks, in the VB, may have the same program/erase (P/E) cycles. A controller of the SSD may maintain separate pools of VBs for user data and system data. A VB that stores user data may be referred to as a "user VB." Blocks of the user VB may be referred to as "user physical blocks." A VB that stores system data may be referred to as a "system VB." Blocks of the system VB may be referred to as "system physical blocks." System data may be stored on single level cell (SLC) blocks due to the high reliability requirement for the system data whereas user data may be stored on triple level cell (TLC) blocks. Some blocks may be overprovisioned, or reserved, per die to be replacements for bad blocks.

As the age of non-volatile memory devices of an SSD increases, the reliability of such non-volatile memory devices may tend to decrease. The decrease in reliability may manifest as an increase in read errors, ultimately reducing the performance of the SSD.

An error correction code (ECC) correction rate (CR) of a low-density parity-check (LDPC) hard decoder may be around, for example, 0.9%. On the other hand, an uncorrectable bit error rate (UBER) for the SSD drive may be significantly higher, typically <1 sector per 10^17 bits read. To achieve a desired correction rate, a controller (e.g., firmware) can potentially perform operations, such as read retry, threshold voltage (Vth) tracking, soft LDPC decoding, and/or redundant array of independent disks (RAID) recovery procedures to adjust read threshold voltage. Such operations can potentially not only increase read latency, but also cause issues, such as read disturb, on surrounding pages due to repetitive reads on a target page. Read disturb may thus affect the performance (e.g., read latency) of the SSD by negatively impacting not only a target page from which data is read, but also from pages that are proximate to the target page.

Certain physical blocks, on which a VB is implemented, may have "weaker" memory cells (e.g., cells that are prone to errors such as read errors). With increase in P/E cycles, these "weaker" memory cells may undergo stress-induced dielectric breakdown leading to relatively higher bit error rate (BER) when read. In this regard, even though BER increases with P/E cycles, such weaker blocks (e.g., blocks with lower write-erase endurance) can experience higher average BER per P/E cycle than other blocks with the same P/E cycles.

Implementations described herein are directed to a proactive method to identify blocks (or memory blocks) with weaker memory cells and to manage average individual BER per program/erase (P/E) cycle, thereby maintaining both predictable read latency and ensuring that the UBER of the SDD is below a threshold UBER (e.g., <1 sector per 10^17 bit read or some other suitable threshold). Accordingly, implementations described herein reduce the risk of running into a high BER situation that leads to ECC decoding failures. Such implementations may ultimately improve the performance of an SSD by reducing read latency and preventing potential data loss.

Implementations described herein are directed to a telemetry-based method to proactively identify blocks (e.g., physical blocks that are used to implement VBs) which exhibit relatively greater quantities of P/E cycles (e.g., comparatively greater quantities of P/E cycles and/or quantities of P/E cycles above a threshold quantity) and/or higher measures of BER (e.g., comparatively greater measures of BER and/or measures of BER above a threshold measure). Implementations may include remediating the use of the physical blocks, which may include initiating a garbage collection procedure on identified blocks and/or swapping the identified blocks with other blocks (e.g., reserved blocks, blocks with fewer P/E cycles, blocks with lower measures of BER, or the like). The method of some implementations reduces the overall UBER of the SSD and improves reliability of the SSD. Implementations described herein are directed to a method to avoid P/E cycle-dependent ECC uncorrectable read errors on weaker blocks.

Implementations described herein reduce read latencies and improve the QoS of the drive by avoiding recovery procedures due to P/E cycle-dependent read errors (e.g., read errors that increase as a function of increasing P/E cycles). Implementations described herein enhance drive life by reducing read disturb on NAND pages caused by repetitive reads on the particular NAND pages and/or surrounding NAND pages. Implementations described herein effectively conserve overprovisioning of an SSD by reusing identified blocks (e.g., blocks identified as exhibiting a relatively high quantity of P/E cycles and/or a relatively high measure of BER). The identified blocks may not be used to store user data (e.g., provided by a host device). Rather, the identified blocks may be used to store other data, as described herein. As discussed below, reusing such blocks may include allocating the blocks as overprovisioned or "reserved" blocks. In accordance with some implementations, the reused blocks may be implemented as SLC blocks. Additionally, or alternatively, in some embodiments, reused blocks may be marked or flagged with an indication that such blocks should be programmed with modified (e.g., slower) trim settings, thereby increasing their reliability and enhancing their lifetime.

In some embodiments, some or all of the operations described herein may be implemented by a controller of a memory device, such as an SSD. In accordance with some implementations, the controller may be programmed and/or otherwise configured to perform such operations. The operations performed in accordance with some implementations may improve read latency and/or overall QoS of the SSD by monitoring the quantity of P/E cycles and/or BER of physical blocks, and swapping identified physical blocks (e.g., blocks with relatively high P/E cycles and/or BER), which include user data (e.g., which have been programmed with data to store) with other blocks, such as available SLC blocks allocated for system data, reserved blocks (e.g., overprovisioned blocks) from the same die that includes the identified blocks, and/or other unused and available blocks.

In some implementations, as noted above, blocks identified with relatively high P/E cycles and/or BER, may be flagged or marked with a particular indicator, where the indicator is associated with a modified trim setting. A "trim setting" may be used to refer to operating parameters defined during manufacturing the SSD or defined during usage of the SSD. The operating parameters may relate to a speed of programming data to a block. The block may be a block that stores data that is not used by the SSD and/or by the host device. The operating parameters may be defined during usage using a system algorithm executed by firmware of the SSD. The modified trim setting may, for example, be a longer or delayed trim setting with respect to blocks that do not include the particular indicator. The modified trim setting may indicate a relatively increased margin between program states (or charge states), as compared to a margin between program states for blocks that are not flagged with such indicator. In some implementations, the modified trim settings may be applied in scenarios where blocks, such as system blocks, overprovisioned blocks, or other blocks on the die are not available for swapping (e.g., if the blocks of the die have already been used or allocated). The modified trim settings may include an increased margin between program states, thus improving the reliability of the block.

FIG. 1 illustrates an example of controller 101, which may be a controller of a memory device such as an SSD, monitoring metrics associated with one or more virtual blocks 103 (e.g., virtual blocks 103-1, 103-2, 103-3, 103-4, and so on) provided via the SSD. As discussed above, virtual blocks 103 may each be implemented via one or more physical blocks of the SSD. In accordance with some implementations, controller 101 may monitor metrics such as P/E cycles (abbreviated in the figures as "PEC") and/or BER. In accordance with some implementations, controller 101 may monitor additional or different metrics associated with virtual blocks 103. In some implementations, controller 101 may monitor or determine the metrics as part of, or subsequent to, programming operations for each virtual block 103. In some implementations, controller 101 may monitor or determine the metrics on a periodic basis, an intermittent basis, an event-driven basis, and/or some other ongoing basis.

Figure 2:
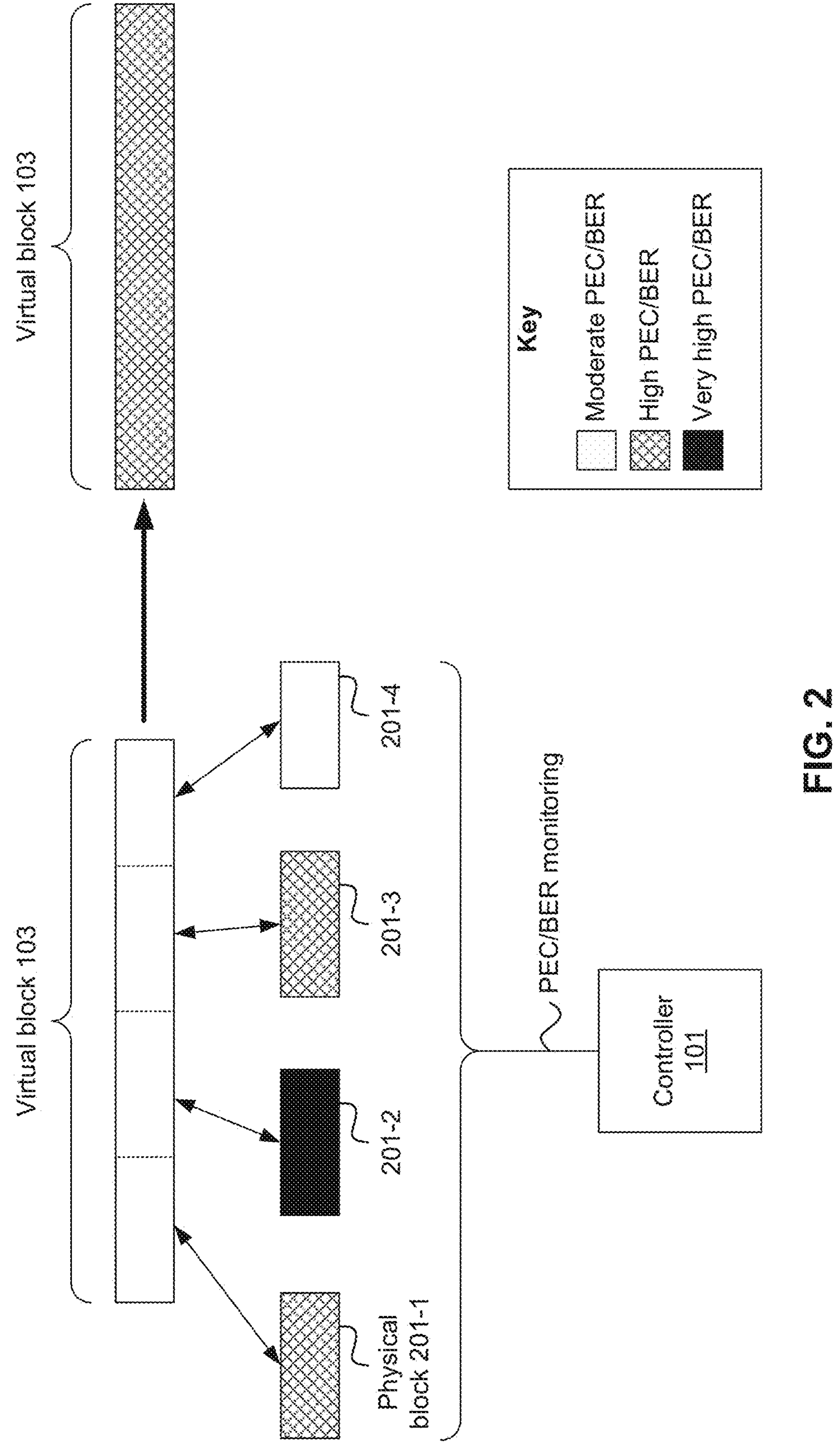

In some implementations, controller 101 may perform the monitoring via a scan read of one data frame of 4 KB read from one page of different physical blocks that implement a given virtual block 103. For example, as shown in FIG. 2, an example virtual block 103 may be implemented by a set of physical blocks, such as physical blocks 201-1, 201-2, 201-3, and 201-4. Controller 101 may monitor PEC and/or BER for each physical block 201. In this example, physical blocks 201-1 and 201-3 exhibit relatively high PEC and/or BER, physical block 201-2 exhibits relatively very high PEC and/or BER, and physical block 201-4 exhibits relatively moderate PEC and/or BER. The terms "high," "very high," "moderate," "low," and so on, as used herein, are used for the purposes of illustration. In practice, other values or scores may be used to represent similar concepts. For example, normalized scores (e.g., on a scale of 1-100), raw values (e.g., actual rates or quantities that specify PEC and/or BER), or the like may be used in practice. Further, these terms may be considered as comparable to each other (e.g., "high" PEC and/or BER may be considered as being a higher measure of PEC and/or BER than a "low" PEC and/or BER), and/or may be considered as comparable to one or more thresholds (e.g., "high" PEC and/or BER may be above a first threshold, "very high" PEC and/or BER may be above a higher second threshold, "moderate" PEC and/or BER may be below the first threshold, and so on).

Controller 101 may maintain a measure of PEC and/or BER of each physical block 201 over time. Controller 101 may further determine an overall measure of PEC and/or BER for virtual block 103 based on the individual measures of PEC and/or BER determined for the physical blocks 201 that implement virtual block 103. For example, in this example, the overall measure of PEC and/or BER for virtual block 103 may be "high," based on computing an average, median, or other operation on the measures of PEC and/or BER for physical blocks 201.

In some implementations, such operation may exclude some physical blocks 201 when determining the overall measure of PEC and/or BER for virtual block 103. For example, in some implementations, only physical blocks 201 with greater than a threshold measure of PEC and/or BER may be included when computing the overall PEC and/or BER for virtual block 103. In such implementations, for example, the "moderate" PEC and/or BER for physical block 201-4 may be excluded when computing the overall PEC and/or BER for virtual block 103. In some implementations, the measure of PEC and/or BER for a given physical block 201 may be a function of BER and PEC, such as based on a cumulative quantity of bit errors for the given physical block 201 divided by a quantity of PECs for such physical block 201.

In some implementations, controller 101 may maintain information indicating per-virtual block PEC and/or BER. Data structure 301, shown in FIG. 3, illustrates an example of such per-virtual block PEC and/or BER that may be maintained by controller 101. In this example, information for each virtual block 103 may include a virtual block identifier (e.g., VB0, VB1, VB2, and so on), a measure of PEC and/or BER, an indication of whether such virtual block 103 is available for writes (e.g., has not been programmed with data to be stored by such virtual block 103), and a type. The "type" indicated in data structure 301 may include, for example, whether a given virtual block 103 is a system block (e.g., implemented as an SLC block), an overprovisioned (OP) block, or a user block that is in a pool of available blocks to which user data may be programmed.

In some implementations, controller 101 may monitor the PEC and/or BER for some or all of the virtual blocks 103 (e.g., virtual blocks 103 that have user data programmed, such as virtual blocks 103 marked as not available). Controller 101 may identify one or more virtual blocks 103 for which PEC and/or BER is excessive, such as virtual blocks 103 for which PEC and/or BER is comparatively higher than other blocks, virtual blocks 103 for which PEC and/or BER is higher than other blocks by at least a threshold amount, virtual blocks 103 for which PEC and/or BER is higher than one or more thresholds (e.g., virtual blocks 103 with a "very high" measure of PEC and/or BER), and/or may otherwise identify virtual blocks 103 with excessive PEC and/or BER using some other suitable technique.

Figure 4:
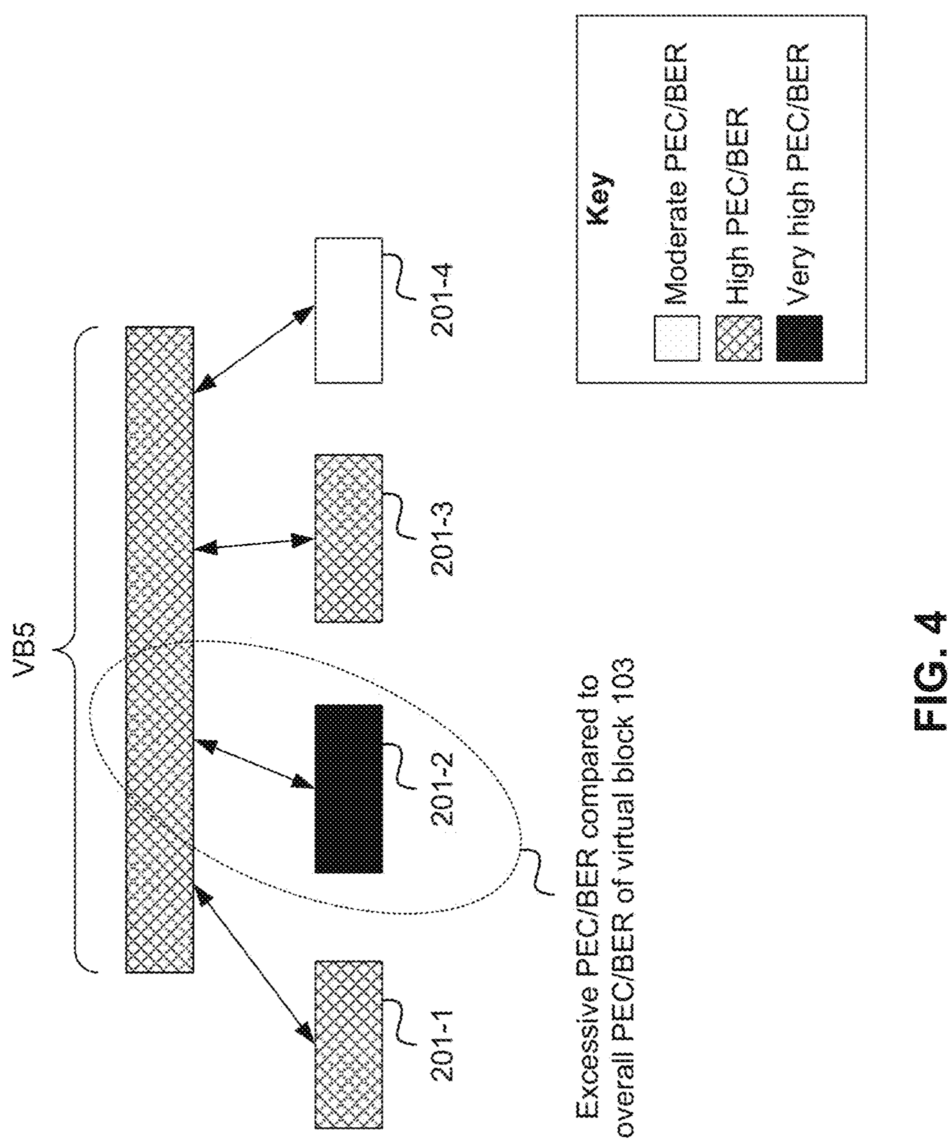
FIG. 4 illustrates an example of selecting a particular physical block to remediate based on metrics associated with the physical block and/or of a VB that includes the physical block.

In the example of FIG. 3, assume that controller 101 has identified VB5 as exhibiting excessive PEC and/or BER. As shown in FIG. 4, assume that VB5 is implemented via physical blocks 201-1, 201-2, 201-3, and 201-4. Controller 101 may identify particular physical blocks 201 of VB5 that exhibit excessive PEC and/or BER. Physical blocks 201 that exhibit "excessive" PEC and/or BER in this context may include physical blocks 201 that exhibit PEC and/or BER that is greater than the overall PEC and/or BER for virtual block 103, and/or physical blocks 201 that exhibit PEC and/or BER that is more than a threshold amount greater than the overall PEC and/or BER for virtual block 103. In other words, physical blocks 201 that are outliers with respect to the other physical blocks 201 that implement the given virtual block 103 may be identified as "weaker" or "error-prone" physical blocks 201. In this example, controller 101 may identify that physical block 201-2 exhibits excessive PEC and/or BER, as compared to the overall PEC and/or BER of virtual block 103.

In order to remediate the identified excessively high PEC and/or BER for VB5 (e.g., for physical block 201-2, in this example), controller 101 may select another physical block 201 (e.g., a physical block on the same die as physical block 201-2) to store the data currently stored by physical block 201-2, and may subsequently copy the data from physical block 201-2 to the selected physical block. Controller 101 may, in accordance with some implementations, select another physical block based on factors such as measures of PEC and/or BER for candidate physical blocks, types of candidate physical blocks, and/or availability of candidate physical blocks. For example, controller 101 may avoid selecting physical blocks which are unavailable (e.g., which already have been programmed with user data). As another example, controller 101 may avoid selecting physical blocks with a higher measure of PEC and/or BER than the physical block to be swapped (i.e., higher than physical block 201-2, in this example). As yet another example, controller 101 may avoid selecting physical blocks with a measure of PEC and/or BER that is higher than one or more thresholds.

In some embodiments, the remediation may further include initiating garbage collection procedures with respect to physical block 201-2. Such procedures may include, for example, modifying a mode of physical block 201-2. For example, in implementations where physical block 201-2 is implemented by a multi-level cell (MLC) chip, controller 101 may designate such physical block 201 to be used in an SLC mode or a pseudo-SLC (pSLC) mode, which may be less prone to errors and may therefore mitigate potential issues with physical block 201-2. In some embodiments, physical blocks 201 marked to be used in the SLC or pSLC mode may be allocated to a pool of physical blocks 201 that are implemented as SLC chips, such as system physical blocks 201 and/or overprovisioning physical blocks 201. As another example, as noted above, physical block 201-2 may be marked or designated with a modified trim setting, which may denote modified margins for read operations with respect to physical block 201-2.

In some implementations, in some situations, a particular physical block 201 identified as exhibiting excessive PEC and/or BER may be marked for modified trim settings (e.g., in lieu of being swapped with another virtual block). In some implementations, controller 101 may use a bitmap to keep track of physical blocks in a VBs with modified (e.g., slower) trim programming.

Slower trim program settings may increase the reliability of such physical blocks 201 by increasing the margin between the program states. Implementations described herein may increase data reliability of the die, conserve overprovisioning and maintain predictable read latency by trading with increased program time for error-prone physical blocks.

Although examples may be described herein as an SSD or a NAND device, other storage devices are intended to be interchangeable in the context of the described aspects and examples. The number and arrangement of components shown in the figures are provided as an example.

The example of FIGS. 3 and 4 highlights an implementation in which a particular virtual block 103 (i.e., VB5 in these examples) is identified as having a relatively high overall measure of PEC and/or BER, and then one or more physical blocks 201 are subsequently identified as having a relatively high PEC and/or BER as compared to the overall measure of PEC and/or BER for the particular virtual block 103. In practice, some implementations may compare the measures of PEC and/or BER of physical blocks 201 of a given virtual block 103, without necessarily determining that the overall measure of PEC and/or BER for the given virtual block 103 is relatively high. For example, in such implementations, controller 101 may identify a particular virtual block 103 with a relatively low measure of PEC and/or BER, but may further identify that a particular physical block 201 of virtual block 103 exhibits relatively high PEC and/or BER relative to the measure PEC and/or BER for virtual block 103. In such implementations, this physical block 201 may be selected as a physical block to be remediated, as physical block 201 exhibits excess PEC and/or BER relative to the PEC and/or BER exhibited by virtual block 103 as a whole.

In some embodiments, controller 101 may select physical blocks 201 that exhibit a measure of PEC and/or BER that exceeds a threshold, and/or may forgo selecting physical blocks 201 that exhibit a measure of PEC and/or BER that does not exceed such threshold. For example, controller 101 may identify a particular physical block 201 that exhibits relatively higher PEC and/or BER than the PEC and/or BER exhibited by virtual block 103 that includes the particular physical block 201, but may also identify that the PEC and/or BER for the particular physical block 201 does not exceed a threshold measure of PEC and/or BER. In this example, even though physical block 201 exhibits relatively greater PEC and/or BER than the virtual block 103 which includes physical block 201, physical block 201 may not be selected for remediation based on not exceeding the threshold measure of PEC and/or BER.

Figure 5:
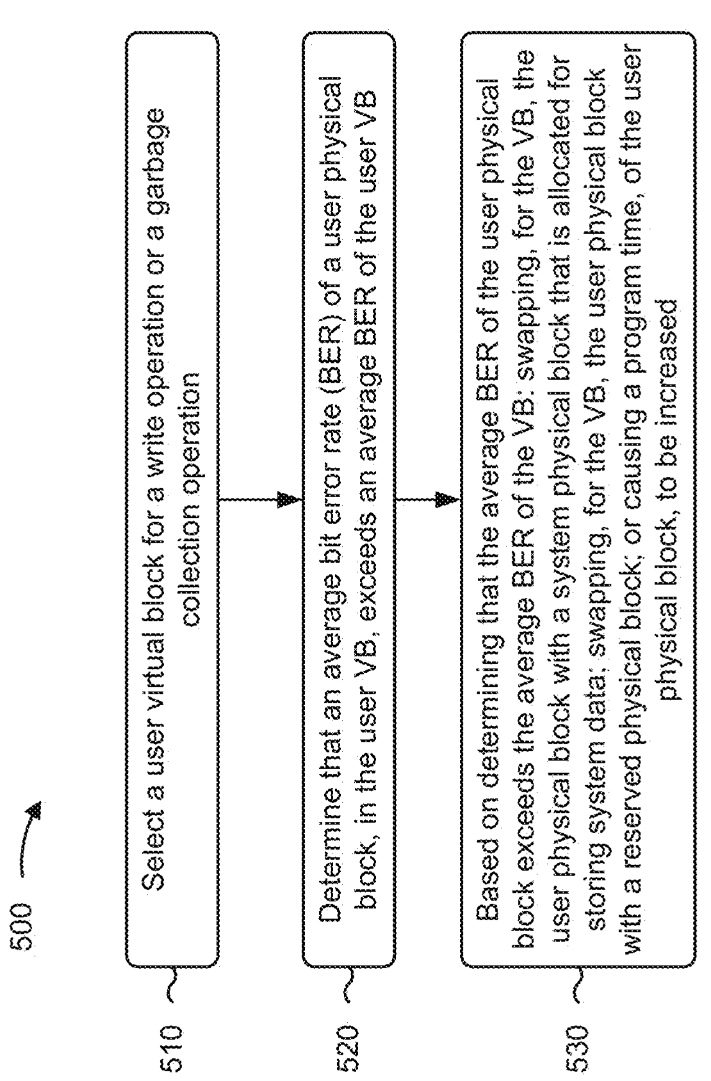
FIG. 5 is a flowchart of an example process associated with swapping a physical block based on metrics associated with the physical block and/or of a VB that includes the physical block, as described herein.

FIG. 5 is a flowchart of an example process 500 associated with swapping a physical block of a virtual block based on PEC and/or BER of the physical block and/or of the virtual block, as described herein. In some implementations, one or more process blocks of FIG. 5 may be performed by a controller of an SSD, such as controller 101.

As shown in FIG. 5, process 500 may include selecting a user virtual block (VB), for a host write operation or a garbage collection operation (block 510). For example, the controller may select a user VB, for a host write operation or a garbage collection operation. In some examples, the user physical block previously stored user data. In some examples, the user VB may have previously been programmed in accordance with TLC programming.

As further shown in FIG. 5, process 500 may include determining that an average bit error rate (BER) of a user physical block in the user VB exceeds an average BER of the user VB (block 520). For example, the controller may determine that an average bit error rate (BER) of a user physical block in the user VB exceeds an average BER of the user VB, as described above. While FIG. 5 is described in the context of BER, other metrics may be used in addition to or in lieu of BER, such as a PEC count.

As further shown in FIG. 5, process 500 may include, based on determining that the average BER of the user physical block exceeds the average BER of the user VB, swapping, for the user VB, the user physical block with a system physical block (e.g., a system physical block that is allocated for storing system data, an overprovisioning physical block, and/or some other available physical block); swapping, for the user VB, the user physical block with a reserved physical block; and/or causing a program time, of the user physical block, to be increased (block 530). For example, controller 101 may, based on determining that the average BER of the user physical block exceeds the average BER of the user VB, swap, for the user VB, the user physical block with a system physical block that is allocated for storing system data; swap, for the user VB, the user physical block with a reserved physical block, and/or cause a program time, of the user physical block, to be increased, as described above. In some implementations, the user physical block, the system physical block, and the reserved physical block are included on a same die.

In some implementations, swapping the user physical block with the system physical block comprises determining whether a number of program/erase cycles of the user physical block exceeds a number of program/erase cycles of one or more system physical blocks included on the same die, wherein the one or more system physical blocks include the system physical block, and swapping the user physical block with the system physical block based on determining whether the number of program/erase cycles of the user physical block exceeds the number of program/erase cycles of the one or more system physical blocks.

In some implementations, swapping the user physical block with the reserved physical block comprises determining that the number of program/erase cycles of the user physical block does not exceed the number of program/erase cycles of the one or more system physical blocks, and swapping the user physical block with the reserved physical block based on determining that the number of program/erase cycles of the user physical block does not exceed the number of program/erase cycles of the one or more system physical blocks.

In some implementations, causing the program time to be increased comprises determining that the number of program/erase cycles of the user physical block does not exceed the number of program/erase cycles of the one or more system physical blocks, determining that an SSD, associated with the VB, is associated with a write-intensive workload, and causing the program time to be increased based on determining that the number of program/erase cycles of the user physical block does not exceed the number of program/erase cycles of the one or more system physical blocks, and determining that the SSD is associated with a write intensive workload.

In some implementations, process 500 includes swapping, for the VB, the user physical block with the system physical block, and updating VB information, regarding the VB, to indicate that the user physical block has been swapped with the system physical block.

In some implementations, the system physical block, has previously been programmed in accordance with TLC programming, and wherein the method comprises programming the system physical block, using SLC programming after swapping the user physical block with the system physical block.

In some implementations, process 500 includes swapping, for the VB, the user physical block with the reserved physical block, and updating VB information, regarding the VB, to indicate that the user physical block has been swapped with the reserved physical block.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
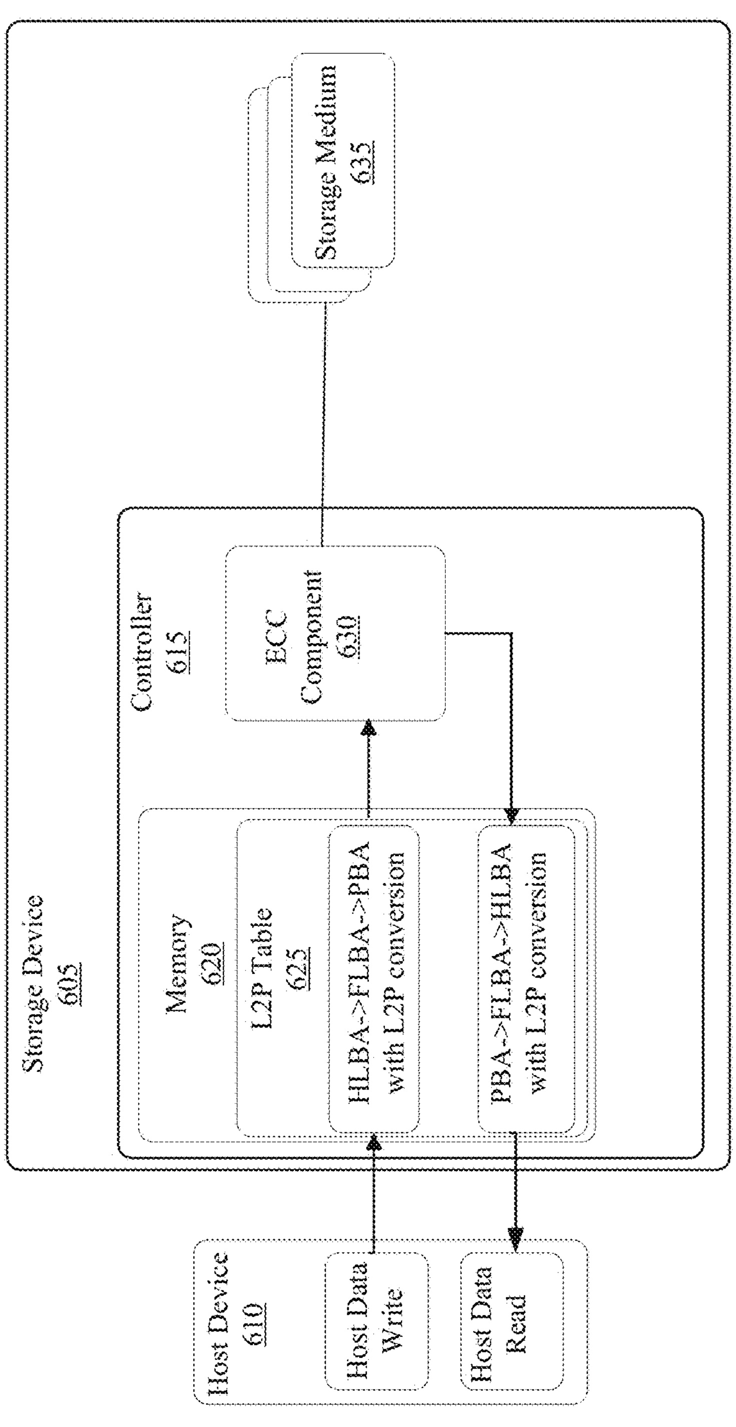
FIG. 6 is a diagram of example components of one or more devices that may be used in one or more implementations described herein.

FIG. 6 is a diagram 600 of example components of one or more devices that may be used in one or more implementations described herein. Example 600 describes components and operations associated with a storage device 605. In some implementations, storage device 605 may include a solid state drive (SSD). As shown in FIG. 6, storage device 605 may be associated with a host device 610. Host device 610 may access data (also referred to as "host data") stored by storage device 605. For example, as shown in FIG. 6, host device 610 may initiate a host data write operation (e.g., a write operation) to write the host data to storage device 605 (e.g., to store the data on storage device 605) and may initiate a host read operation (e.g., a read operation) to read the host data from storage device 605.

Host device 610 may include one or more devices capable of receiving, generating, storing, processing, and/or providing information associated with generating a logical to physical (L2P) data structure (or L2P table), as described elsewhere herein. The host device 610 may include a communication device and a computing device. For example, the host device 610 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

As shown in FIG. 6, storage device 605 may include a controller 615. Controller 615 may include one or more of an application specific integrated circuit (ASIC) or firmware. Controller 615 may cause functions to be performed on storage device 605, such as read operations, write operations, erase operations, garbage collection operations, among other examples. Controller 615 may include a memory 620 and an error correction code (ECC) component 630. Memory 620 may include a RAM (e.g., dynamic random access memory (DRAM), a synchronous DRAM (SDRAM), among other examples).

As shown in FIG. 6, memory 620 may include an L2P table 625 (or an L2P data structure). L2P table 625 may store a mapping between host logical block addresses (or logical addresses identified by host device 610) and physical block addresses (or physical addresses of non-volatile memory devices of storage device 605). In some implementations, L2P table 625 may be generated by controller 615.

In some implementations, controller 615 may identify a host logical block address (HLBA) associated with the host data by which host device 610 may reference the host data in a future read operation. As shown in FIG. 6, controller 615 may convert the HLBA to a flash logical block address (FLBA) or other local logical block address, and then may link the FLBA to a physical block address (PBA) using an L2P conversion. Conversely, controller 615 may convert a PBA to an FLBA or other local logical block address, and then may link the FLBA to an HLBA using a physical to logical conversion. In this way, the host device may send a static address associated with the host data, controller 615 may link the address known to host device 610 to an address known to storage device 605 (the FLBA), and may link the address known to storage device 605 to a physical address of the host data within a storage medium of storage device 605.

Controller 615 may store the links between the HLBA, the FLBA, and the PBA in L2P table 625. In some aspects, the host data may be moved within the storage medium or between storage mediums of storage device 605, which controller 615 may note in the link between the FLBA and the physical location. In this way, the HLBA may bypass being updated when the host data is moved to a new PBA.

ECC component 630 may include an ECC engine. ECC component 630 may perform error correction code encoding on the host data. In some implementations, the error correction code encoding may include adding redundancy, parity bits, or other information that can later be used to identify errors in the host data when read from the storage medium. Controller 615 may provide the host data, after encoding, via flash control channels (not shown) to write on storage mediums of storage device 605.

As shown in FIG. 6, storage device 605 may include storage mediums 635 (individually "storage medium 635" and collectively "storage mediums 635"). A storage medium 635 may include a non-volatile memory device. For example, the storage medium 635 may include a NAND memory device.

As indicated above, FIG. 6 is provided as an example. Other examples may differ from what is described with regard to FIG. 6. The number and arrangement of devices shown in FIG. 6 are provided as an example. In practice, there may be additional devices, fewer devices, different devices, or differently arranged devices than those shown in FIG. 6. Furthermore, two or more devices shown in FIG. 6 may be implemented within a single device, or a single device shown in FIG. 6 may be implemented as multiple, distributed devices. Additionally, or alternatively, a set of devices (e.g., one or more devices) shown in FIG. 6 may perform one or more functions described as being performed by another set of devices shown in FIG. 6.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

As used herein, the term "component" is intended to be broadly construed as hardware, firmware, or a combination of hardware and software. It will be apparent that systems or methods described herein may be implemented in different forms of hardware, firmware, or a combination of hardware and software. The actual control hardware or software code used to implement these systems or methods is not limiting of the implementations. Thus, the operation and behavior of the systems or methods are described herein without reference to specific software code—it being understood that software and hardware can be used to implement the systems or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims or disclosed in the specification, these combinations are not intended to limit the disclosure of various implementations. In fact, many of these features may be combined in ways not specifically recited in the claims or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein is to be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "or," unless explicitly stated otherwise (e.g., if used in combination with "either" or "only one of").

What is claimed is:

1. A method comprising:

selecting a user virtual block (VB), for a host write operation or a garbage collection operation,
  wherein the user VB previously stored user data, and
  wherein the user VB has previously been programmed in accordance with triple-level cell (TLC) programming;

determining that an average bit error rate (BER) of a user physical block in the user VB exceeds an average BER of the user VB; and based on determining that the average BER of the user physical block exceeds the average BER of the user VB:
  swapping, for the user VB, the user physical block with a system physical block that is allocated for storing system data;
  swapping, for the user VB, the user physical block with a reserved physical block; or
  causing a program time, of the user physical block, to be increased.

2. The method of claim 1, wherein the user physical block, the system physical block, and the reserved physical block are included on a same die.

3. The method of claim 2, wherein swapping the user physical block with the system physical block comprises:

determining whether a number of program/erase cycles of the user physical block exceeds a number of program/erase cycles of one or more system physical blocks included on the same die,
  wherein the one or more system physical blocks include the system physical block; and swapping the user physical block with the system physical block based on determining whether the number of program/erase cycles of the user physical block exceeds the number of program/erase cycles of the one or more system physical blocks.

4. The method of claim 3, wherein swapping the user physical block with the reserved physical block comprises:

determining that the number of program/erase cycles of the user physical block does not exceed the number of program/erase cycles of the one or more system physical blocks; and swapping the user physical block with the reserved physical block based on determining that the number of program/erase cycles of the user physical block does not exceed the number of program/erase cycles of the one or more system physical blocks.

5. The method of claim 3, wherein causing the program time to be increased comprises:

determining that the number of program/erase cycles of the user physical block does not exceed the number of program/erase cycles of the one or more system physical blocks;

determining that a solid state drive (SSD), associated with the user VB, is associated with a write intensive workload; and causing the program time to be increased based on:
  determining that the number of program/erase cycles of the user physical block does not exceed the number of program/erase cycles of the one or more system physical blocks, and
  determining that the SSD is associated with the write intensive workload.

6. The method of claim 1, further comprising:

swapping, for the user VB, the user physical block with the system physical block; and updating VB information, regarding the user VB, to indicate that the user physical block has been swapped with the system physical block.

7. The method of claim 6, wherein the system physical block has previously been programmed in accordance with triple-level cell (TLC) programming, and
wherein the method further comprises:
programming the system physical block, using single level cell (SLC) programming after swapping the user physical block with the system physical block.

8. The method of claim 1, further comprising:
swapping, for the user VB, the user physical block with the reserved physical block; and
updating VB information, regarding the user VB, to indicate that the user physical block has been swapped with the reserved physical block.

9. A system comprising:
a controller configured to:
select a first physical block, of a virtual block (VB), for a host write operation or a garbage collection operation,
wherein the first physical block previously stored user data;
determine that an average bit error rate (BER) of the first physical block exceeds an average BER of the VB; and
based on determining that the average BER of the first physical block exceeds the average BER of the VB:
swap, for the VB, the first physical block with a second physical block; or
cause a program time, of the first physical block, to be increased.

10. The system of claim 9, wherein the controller is further configured to:
swap, for the VB, the first physical block with the second physical block; and
update VB information, regarding the VB, to indicate that the first physical block has been swapped with the second physical block.

11. The system of claim 10, wherein, to update the VB information, the controller is further configured to:
update a bitmap to indicate that the first physical block has been swapped with the second physical block.

12. The system of claim 9, wherein the controller is further configured to:
cause a program time, of the first physical block, to be increased; and
update VB information, regarding the VB, to indicate that the program time has been increased.

13. The system of claim 9, wherein the first physical block and the second physical block are included on a same die.

14. A non-transitory computer-readable medium storing a set of instructions, the set of instructions comprising:
one or more instructions that, when executed by one or more processors of a controller, cause the controller to:
determine that an average bit error rate (BER) of a user physical block, of a virtual block (VB), exceeds an average BER of the VB; and
based on determining that the average BER of the physical block exceeds the average BER of the VB:
swap, for the VB, the user physical block with a system physical block that is allocated for storing system data;
swap, for the VB, the user physical block with a reserved physical block; or
cause a program time, of the user physical block, to be increased.

15. The non-transitory computer-readable medium of claim 14, wherein the user physical block, the system physical block, and the reserved physical block are included on a same die.

16. The non-transitory computer-readable medium of claim 15, wherein the one or more instructions, that cause the controller to swap the user physical block with the system physical block, further cause the controller to:
determine whether a number of program/erase cycles of the user physical block exceeds a number of program/erase cycles of one or more system physical blocks included on the same die,
wherein the one or more system physical blocks include the system physical block; and
swap the user physical block with the system physical block based on determining whether the number of program/erase cycles of the user physical block exceeds the number of program/erase cycles of the one or more system physical blocks.

17. The non-transitory computer-readable medium of claim 16, wherein the one or more instructions, that cause the controller to swap the user physical block with the reserved physical block, further cause the controller to:
determine that the number of program/erase cycles of the user physical block does not exceed the number of program/erase cycles of the one or more system physical blocks; and
swap the user physical block with the reserved physical block based on determining that the number of program/erase cycles of the user physical block does not exceed the number of program/erase cycles of the one or more system physical blocks.

18. The non-transitory computer-readable medium of claim 16, wherein the one or more instructions, that cause the controller to cause the program time to be increased, further cause the controller to:
determine that the number of program/erase cycles of the user physical block does not exceed the number of program/erase cycles of the one or more system physical blocks;
determine that a storage device, associated with the VB, is associated with a write intensive workload; and
cause the program time to be increased based on:
determining that the number of program/erase cycles of the user physical block does not exceed the number of program/erase cycles of the one or more system physical blocks, and
determining that the storage device is associated with the write intensive workload.

19. The non-transitory computer-readable medium of claim 14, wherein the one or more instructions further cause the controller to:
swap, for the VB, the user physical block with the system physical block; and
update VB information, regarding the VB, to indicate that the user physical block has been swapped with the system physical block.

20. The non-transitory computer-readable medium of claim 19, wherein the system physical block has previously been programmed in accordance with triple-level cell (TLC) programming, and
wherein the one or more instructions further cause the controller to:
program the system physical block using single level cell (SLC) programming after swapping the user physical block with the system physical block.

21. The non-transitory computer-readable medium of claim 14, wherein the one or more instructions further cause the controller to:

swap, for the VB, the user physical block with the reserved physical block; and update VB information, regarding the VB, to indicate that the user physical block has been swapped with the reserved physical block.

* * * * *